United States Patent
Hwang et al.

(10) Patent No.: US 9,584,441 B2
(45) Date of Patent: Feb. 28, 2017

(54) METHOD AND APPARATUS FOR TRANSMITTING A MULTIMEDIA DATA PACKET USING CROSS-LAYER OPTIMIZATION

(75) Inventors: Sung-Oh Hwang, Yongin-si (KR); Kyung-Mo Park, Seoul (KR); Jae-Yeon Song, Seoul (KR); Doug Young Suh, Seongnam-si (KR); Yong-Il Kwon, Incheon (KR)

(73) Assignees: Samsung Electronics Co., Ltd., Suwon-si (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 75 days.

(21) Appl. No.: 13/980,485

(22) PCT Filed: Jan. 19, 2012

(86) PCT No.: PCT/KR2012/000499
§ 371 (c)(1),
(2), (4) Date: Jul. 18, 2013

(87) PCT Pub. No.: WO2012/099417
PCT Pub. Date: Jul. 26, 2012

(65) Prior Publication Data
US 2013/0286885 A1 Oct. 31, 2013

(30) Foreign Application Priority Data
Jan. 19, 2011 (KR) .................. 10-2011-0005262

(51) Int. Cl.
*G01R 31/08* (2006.01)
*H04L 12/927* (2013.01)
(Continued)

(52) U.S. Cl.
CPC ....... *H04L 47/805* (2013.01); *H04N 21/2381* (2013.01); *H04N 21/234327* (2013.01); *H04N 21/647* (2013.01); *H04N 21/8451* (2013.01)

(58) Field of Classification Search
CPC .............. H04L 47/805; H04N 21/647; H04N 21/234327; H04N 21/8451; H04N 21/2381; H04N 21/8485; H04N 21/18451
See application file for complete search history.

(56) References Cited

U.S. PATENT DOCUMENTS 6,496,510 B1* 12/2002 Tsukakoshi ............. H04L 45/02
370/351
9,344,362 B2* 5/2016 Suh ................ H04N 21/234327
(Continued)

FOREIGN PATENT DOCUMENTS

CN 101272495 A 9/2008
EP 1 311 125 A2 5/2003
(Continued)

*Primary Examiner* — Robert Wilson
(74) *Attorney, Agent, or Firm* — Jefferson IP Law, LLP

(57) ABSTRACT

An apparatus and method for transmitting a multimedia data packet are provided. The method includes receiving Bottom-up Network Abstraction Layer (B-NAL) information from a network entity, determining a media data quality based on the received B-NAL information and generating media data having the determined media data quality, and generating a packet including the generated media data and transmitting the packet to the network entity.

2 Claims, 6 Drawing Sheets

(51) Int. Cl.
  *H04N 21/2381*   (2011.01)
  *H04N 21/647*    (2011.01)
  *H04N 21/2343*   (2011.01)
  *H04N 21/845*    (2011.01)

(56) References Cited

U.S. PATENT DOCUMENTS

| | | |
|---|---|---|
| 2005/0244070 A1 | 11/2005 | Itakura |
| 2006/0056455 A1 | 3/2006 | Floriach et al. |
| 2006/0253888 A1 | 11/2006 | Senga et al. |
| 2007/0206592 A1 | 9/2007 | Itakura et al. |
| 2008/0066101 A1* | 3/2008 | Song ............... H04H 60/13 725/37 |
| 2008/0232472 A1 | 9/2008 | Kwon |
| 2009/0175353 A1* | 7/2009 | Suh ............ H04N 21/234327 375/240.25 |
| 2010/0189182 A1* | 7/2010 | Hannuksela ... H04N 21/234327 375/240.25 |
| 2012/0023155 A1* | 1/2012 | Myers .......... H04N 21/234327 709/203 |
| 2012/0250690 A1* | 10/2012 | Suh ................ H04N 21/2381 370/392 |
| 2013/0272121 A1* | 10/2013 | Stanwood ........ H04L 47/2475 370/230 |
| 2013/0286885 A1* | 10/2013 | Hwang ............ H04N 21/2381 370/252 |

FOREIGN PATENT DOCUMENTS

| | | | |
|---|---|---|---|
| EP | 1 788 813 | * | 5/2007 |
| EP | WO 2008/023891 | * | 2/2008 |
| EP | WO 2008/085013 | * | 7/2008 |
| EP | WO 2009/154656 | * | 12/2009 |
| GB | 2453823 | | 4/2009 |
| JP | 2003-152544 A | | 5/2003 |
| JP | 2003-244676 A | | 8/2003 |
| JP | 2004-266330 A | | 9/2004 |
| JP | 2005-204157 A | | 7/2005 |
| KR | 10-2008-0066624 A | | 7/2008 |
| KR | 10-2008-0086764 A | | 9/2008 |
| KR | 10-2009-0049955 A | | 5/2009 |
| KR | 10-2009-0101829 A | | 9/2009 |
| KR | 10-2009-0112684 A | | 10/2009 |
| WO | 03/053040 A2 | | 6/2003 |
| WO | 2004 075554 A1 | | 9/2004 |

* cited by examiner

METHOD AND APPARATUS FOR TRANSMITTING A MULTIMEDIA DATA PACKET USING CROSS-LAYER OPTIMIZATION

CROSS-REFERENCE TO RELATED APPLICATION(S)

This application is a National Stage application under 35 U.S.C. §371 of an International application filed on Jan. 19, 2012 and assigned application No. PCT/KR2012/000499, and claims the benefit under 35 U.S.C. §365(b) of a Korean patent application filed on Jan. 19, 2011 in the Korean Intellectual Property Office and assigned Serial No. 10-2011-0005262, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) UNIVERSITY-INDUSTRY COOPERATION GROUP OF KYUNG HEE UNIVERSITY.

TECHNICAL FIELD

The present disclosure relates to a method and apparatus for transmitting a multimedia data packet. More particularly, the present disclosure relates to a method and apparatus for transmitting a multimedia data packet through cross-layer optimization.

BACKGROUND

Multimedia service may include interactive services such as a video call, a streaming service such as transmission of Video on Demand (VoD) files, and a multicast and a broadcast service. Real-time multimedia service can be classified into conversational service, interactive service, and streaming service, according to service types. The real-time multimedia service can also be classified into unicast, multicast and broadcast services according to the number of users participating in the service.

To provide multimedia service, a network may provide Quality of Service (QoS) largely in three ways: Best Effort (BE), per class QoS, and per flow QoS. No support is given to guarantee the QoS of BE service. Per-class QoS service prioritizes packets and processes packets according to their priority levels in the network. That is, the QoS of a packet is controlled according to the importance, i.e. priority level of the packet, irrespective of a flow to which the packet belongs. Accordingly, there is no need for reserving resources between a transmitter and a receiver in order to support per-class QoS. For reference, priorities may be categorized into loss priority and delay priority.

Resources are reserved per stream in per-flow QoS service. That is, resources, e.g., a bit rate and a buffer status, or QoS, e.g., a delay, a loss rate, etc., is reserved for each flow. A flow refers to a stream used to provide a service. For instance, a video stream, an audio stream, and a text stream used to provide a VoD service are individual flows. Per-class QoS and per-flow QoS are supported in a $3^{rd}$ Generation Partnership Project (3GPP) Universal Mobile Telecommunications Standard (UMTS) standard, which may also be referred to as 3G, as well as in the Institute for Electrical and Electronics Engineers (IEEE) 802.16 standard, which may also be referred to as Wireless Broadband (WiBRO) and Wireless Interoperability for Microwave Access (WIMAX) and Long Term Evolution (LTE) standards. However, a media layer being a higher layer should be interfaced with a network being a lower layer in order to use the QoS schemes.

Conventionally, Real-time Transport Protocol (RTP) and Real Time Transport Protocol (RTCP) are designed to measure network resources or QoS using information accumulated at service ends without taking into account a lower layer. In the related-art RTP and RTCP, a network part responsible for transmission is kept as a black box and thus it is difficult to accurately identify any change. Therefore, an interface directed immediately from the lower layer should be used for accurate QoS control. In Moving Picture Experts Group (MPEG)-2 and H.264, particularly Scalable Video Coding (SVC), each video packet is different in terms of importance. The importance difference between packets should be identified in order to effectively control the QoS of a video service. To determine the importance of each packet in Internet Protocol (IP) version 6 (IPv6), in a case of packet switching, five tuples, those being a receiver address, a transmitter address, a port number of a service in a receiver, a port number of the service in a transmitter, and a used protocol, should be read from an IPv6 header and then header data representing the importance of the packet should be read from a payload of a video packet. This scheme takes a lot of processing time per packet and violates the independence of a protocol layer.

That is, a router should be able to read only an IP header of a packet in processing the packet, but it does not actually. If the importance of each packet can be readily determined, then the router can actively perform QoS control. For example, if a network state is poor, then the router may discard an unimportant packet first according to the per-packet importance. Meanwhile, SVC or Multi-view Video Coding (MVC), which is under standardization, is based on the H.264/Advanced Video Coding (AVC) standard. Coded data is constructed into a bit stream in the Network Abstraction Layer (NAL) Unit (NALU) format of H.264/AVC.

FIG. 1 illustrates a Video Coding Layer (VCL) and NAL of H.264/AVC according to the related art.

Referring to FIG. 1, in H.264/AVC, a NAL 120 is defined between a VCL 110 that handles video coding and a lower-layer system 130 that transmits and stores the coded information. Thus, the VCL 110 is separated from the NAL 120. The NAL 120 processes coded data 111 generated from the VCL on a NALU basis in order to map the coded data 111 to bit streams of the lower-layer system 130 in a format, such as an H.264/AVC file format 131, an RTP 133, and an MPEG-2 system 135.

NALUs are divided into a VCL NALU 121 and a non-VCL NALU 123. The VCL NALU 121 is a NALU corresponding to the coded data 111 generated in the VCL 110 and the non-VCL NALU 123 is a NALU corresponding to a parameter set, Supplemental Enhancement Information (SEI), or similar information. A NALU includes a NAL header and a Raw Byte Sequence Payload (RBSP) which is a data part resulting from video coding of the VCL.

FIG. 2 illustrates a format of a NALU according to the related art.

Referring to FIG. 2, a NALU 200 includes a NAL Header 210 and NALU Payload 240. The NAL Header 210 typically occupies 1 to 5 bytes. The NAL Header 210 includes NALU Type Information 220 indicating a type of the NALU and Layer Identification Information 230 indicating the layer of compressed original data included in the NALU Payload, i.e. a combination of a priority, a spatial-layer level, a temporal-layer level, and/or a quality-layer level. The NALU Type Information 220 includes a Fixed-bit (F) field 221, a nal_ref_idc (NRI) field 222 being a flag indicating whether the NALU is a reference picture, and a NALU Type field 223 indicating the type of the NALU.

The Layer Identification Information 230 includes a Priority (P) field 231 indicating the priority of the NALU so that the layer of the compressed original data can be identified, a Dependency_id (D) field 232 indicating the spatial-layer level of the NALU, a Temporal_level (T) field 233 indicating the temporal-layer level of the NALU, and/or a Quality_level (Q) field 234 indicating a quality-layer level of the NALU. The same NALU format is used in MVC. In MVC, however, the NALU Type Information 220 and View Identification Information, which indicates a View instead of the Layer Identification Information 230, may be included in the NAL Header.

According to the foregoing NALU format for SVC or MVC, the Layer Identification Information 230 or View Identification Information of the NAL header should be parsed in order to identify the layer or view of the NALU. Particularly, the Layer Identification Information 230 is 2 to 4 bytes long and all of the values of the P, D, T and Q fields 231 to 234 should be determined by parsing the NAL Header 210. Parsing of the entire NAL header 210 to detect the values of the P, D, T and Q fields 231 to 234 imposes a constraint on a processor and increases system cost.

Moreover, the NAL Header 210 includes information from which the importance of a packet may be determined, such as the P field 231. However, since a router processes a packet after reading only an IP header, it may not read the importance identification information from a NALU header. Accordingly, there exists a need for including importance identification information in an IP header so that a router may read the importance identification information.

SUMMARY

Aspects of the present disclosure are to address at least the above-mentioned problems and/or disadvantages and to provide at least the advantages described below. Accordingly, an aspect of the present disclosure is to provide a method and apparatus for providing a multimedia service adaptively according to media data, a network state, and a user's request.

Another aspect of the present disclosure is to provide an integrated Network Abstraction Layer (NAL) for exchanging information with an application layer and a lower-layer network entity.

Another aspect of the present disclosure is to provide a method and apparatus for abstracting states and transmitting and receiving information about the abstracted states between entities in order to provide a multimedia service according to a media data state, a network state, and a user's request state.

In accordance with an aspect of the present disclosure, a method for transmitting a multimedia data packet is provided. The method includes receiving Bottom-up Network Abstraction Layer (B-NAL) information from a network entity, determining a media data quality based on the received B-NAL information and generating media data having the determined media data quality, and generating a packet including the generated media data and transmitting the packet.

In accordance with another aspect of the present disclosure, an apparatus for transmitting a multimedia data packet is provided. The apparatus includes a register configured to receive Bottom-up Network Abstraction Layer (B-NAL) information from a network entity, a media data generating processor configured to determine a media data quality based on the received B-NAL information and generating media data having the determined media data quality, and a packet generating processor configured to generate a packet including the generated media data and transmitting the packet.

Aspects of the present disclosure provide a multimedia data service, taking into account the importance or priority level of media data, a resource reservation state, a network state, or user requirements by providing an integrated Network Abstraction Layer (NAL) applicable to all multimedia data. In addition, communication resources may be efficiently used through Cross-Layer Optimization (CLO) by providing an integrated NAL that may abstract information for information exchange between a higher protocol layer and a lower protocol layer.

Other aspects, advantages, and salient features of the disclosure will become apparent to those skilled in the art from the following detailed description, which, taken in conjunction with the annexed drawings, discloses various embodiments of the present disclosure

BRIEF DESCRIPTION OF THE DRAWINGS

Throughout the drawings, it should be noted that like reference numbers are used to depict the same or similar elements, features, and structures

BEST MODE FOR CARRYING OUT THE INVENTION

The following description with reference to the accompanying drawings is provided to assist in a comprehensive understanding of embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before describing the present disclosure in detail, the basic concept of the present disclosure will first be described. The present disclosure applies a concept of a Network Abstraction Layer (NAL) used in video coding standards, such as Moving Picture Experts Group 4 (MPEG4)/Advanced Video Coding (AVC), and H.264, Scalable Video Coding (SVC), and Multi-view Video Coding (MVC) to other media data, such as audio data, graphic data, text data, and other similar data, as well as video data.

Figure 1:
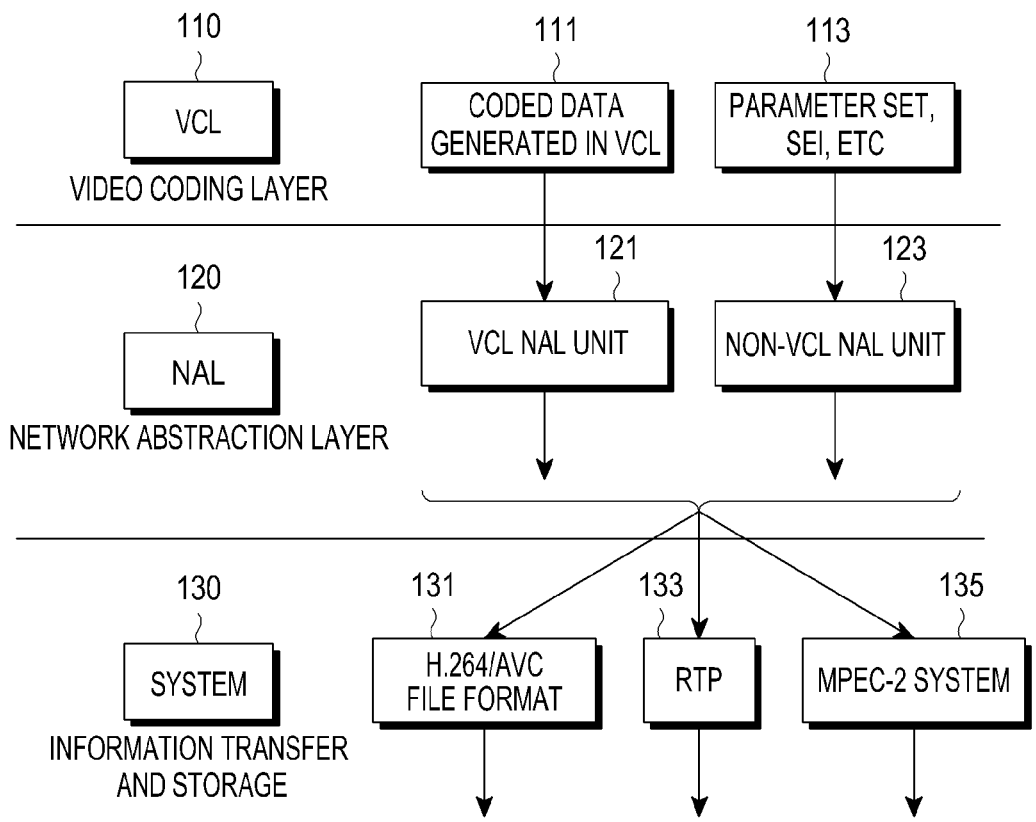
FIG. 1 illustrates a Video Coding Layer (VCL) and a Network Abstraction Layer (NAL) in H.264/Advanced Video Coding (AVC) according to the related art.
Figure 2:
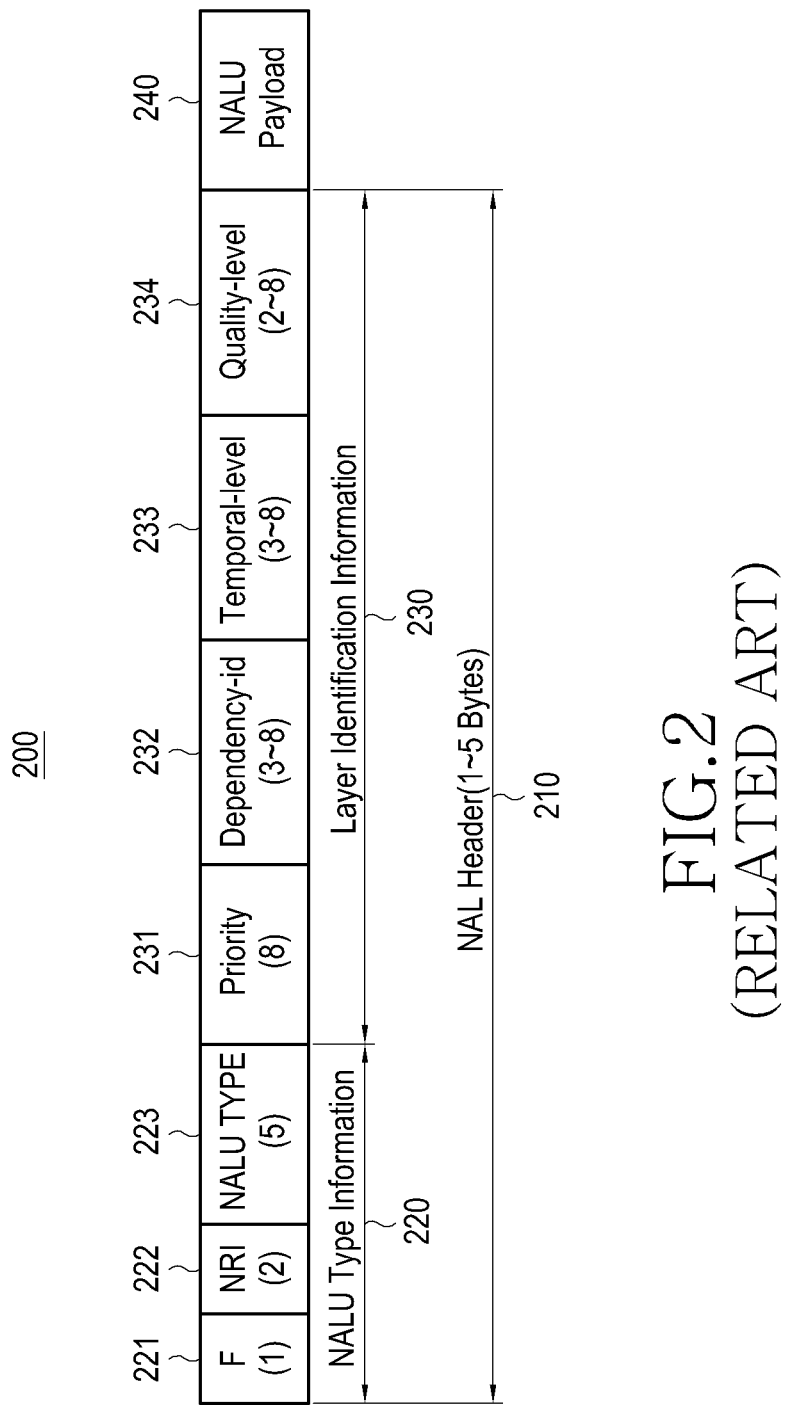
FIG. 2 illustrates a format of a NAL Unit (NALU) according to the related art.

As described before with reference to FIG. 2, the related-art NAL Header 210 includes information indicating the importance of a video packet. An SVC NAL Header includes the Layer Identification Information 230 indicating a temporal layer, a spatial layer, and a quality layer and an MVC Header includes information indicating a view number. The above-described information is generated through abstraction at a top-down interface directed from a higher protocol layer to a lower protocol layer. As this information indicates the importance of a packet, a packet service may be provided adaptively according to a network state or a terminal state.

To extend the concept of the NAL to all media, an identifier called "label" is defined according to an embodiment of the present disclosure. The "label" is an identifier that identifies each individual stream, such as a video stream, an audio stream, and any other similar stream, in the present disclosure.

In addition, the present disclosure proposes a Top-down-NAL (T-NAL) interface, which may also be referred to as a T-NAL, that abstracts information related to media data to be transmitted and a Bottom-up-NAL (B-NAL) interface, which may also be referred to as a B-NAL, that abstracts information related to a network state. Hereinafter, data-related information abstracted at the T-NAL and network state information abstracted at the B-NAL will be referred to as T-NAL information and B-NAL information, respectively.

Meanwhile, a transmitter, such as a server or a terminal, generates the T-NAL information, includes the T-NAL information in the header of a packet, and transmits the packet. A network entity, such as a router or a Base Station (BS), may identify the importance or resource reservation state of the packet using the T-NAL information, and thus, may transmit a packet based on the identified result. The network entity may also generate the B-NAL information. Then the transmitter may adaptively transmit a packet according to a current network state based on the B-NAL information.

Figure 3:
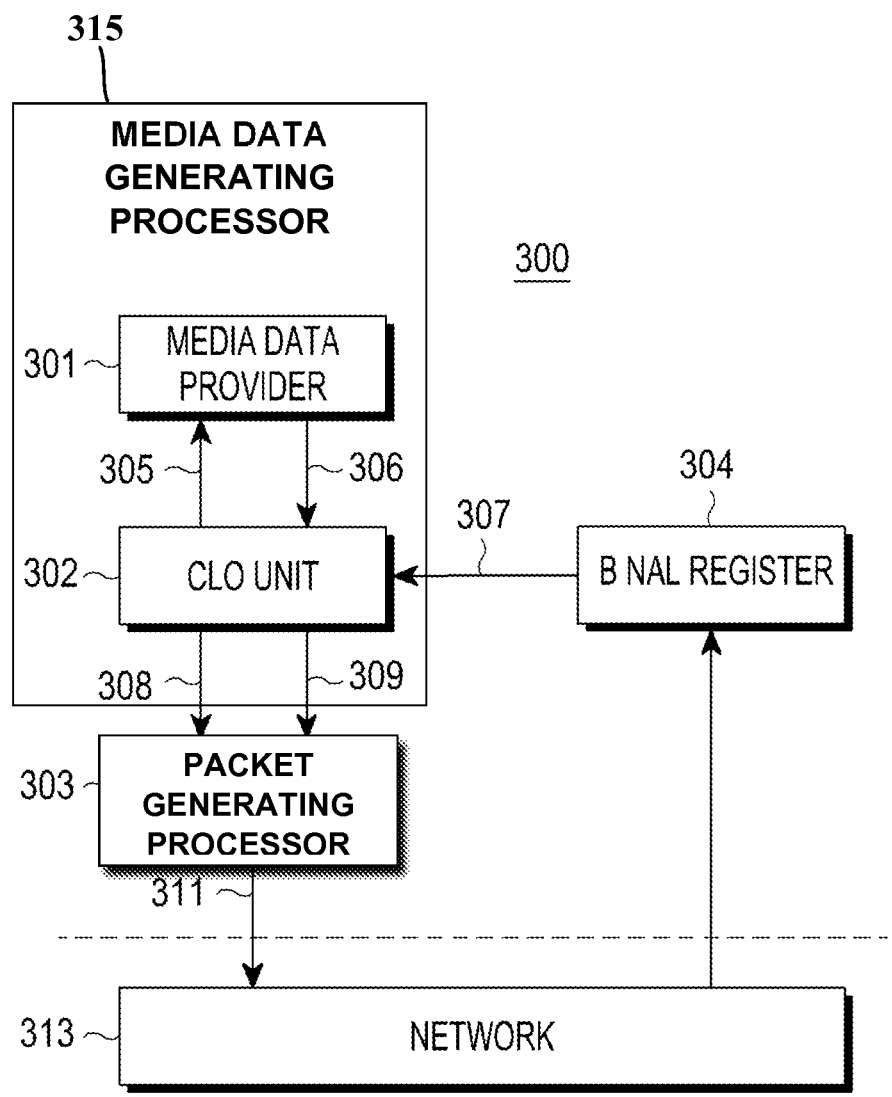
FIG. 3 illustrates an apparatus and method for transmitting a multimedia data packet according to an embodiment of the present disclosure.

FIG. 3 illustrates an apparatus and method for transmitting a multimedia data packet according to an embodiment of the present disclosure.

Referring to FIG. 3, a transmitter 300 may be a server or a terminal. The transmitter 300 includes a media data generating processor 315, the media data generating processor comprising a media data provider 301 and a packet generator 303. The media generating processor 315 also includes components characteristic of the transmitter 300 of the present embodiment of the present disclosure, such as a Cross Layer Optimization (CLO) unit 302 and a B-NAL register 304.

The B-NAL register 304 receives B-NAL information 310 from a network 313 and stores the B-NAL information 310. The B-NAL information may include network state information generated by a network entity. However, the B-NAL information may also include Quality of Service (QoS) information requested by a user terminal or control information suitable for media data control. For example, if a state of the user terminal is too poor to receive a high-QoS service, then the user may request a low-QoS packet service. If the delay and loss of a transmission packet are great, then a specific media may acquire the information from the B-NAL register 304. In this case, the B-NAL information may be information generated by the user terminal according to a request from the user. However, for the sake of convenience, the following description will be given under an assumption that the B-NAL information is network state information.

The CLO unit 302 reads B-NAL information from the B-NAL register 304 or from a received B-NAL packet, adaptively determines the quality of media data to be transmitted according to the B-NAL information, requests the transmission media data in at least one Access Unit (AU) to the media data provider 301 in operation 305, and receives the media data from the media data provider 305 in operation 306.

Subsequently, the CLO unit 302 transmits, to the packet generator 303, the media data to be transmitted in a single IP packet in operation 309. Herein, the CLO unit 302 generates T-NAL information, such as label information about the media data, and transmits the label information to the packet generator 303 in operation 308. As described before, the label information may be used for a lower-layer network to determine the importance, priority level, or resource reservation state of the packet. The packet generator 303 generates a packet including the received label information and transmits the packet to the network 313 in operation 311. The label information may be included in the header of an Internet Protocol (IP) packet or a packet header of another lower-layer protocol.

A packet transmission from the transmitter having the configuration illustrated in the embodiment of FIG. 3 will be described below.

It is assumed that an audio data stream, a text data stream, and a video data stream are labeled with 1, 2 and 3, respectively. It is also assumed that priority levels of the labeled streams have been set among a transmitter, a network entity, and a receiver. When transmitting a video data packet, the transmitter generates and transmits the video data packet with label information set to 3. Then the network entity, such as a router, may identify the importance, the priority level, or the resource reservation information of the received packet based on the label information. Thus the network entity may transmit the packet, taking into account the network state and the importance, the priority level, or the resource reservation information of the received packet.

Meanwhile, the label of each data stream and the importance, the priority level, or the resource reservation information of the data stream corresponding to the label may be set among the transmitter, the receiver, and the network entity during call setup. When the transmitter transmits the video packet, it may consider B-NAL information. That is, the transmitter may adaptively change the transmission priority of the video packet according to a network state indicated by the B-NAL information.

Herein below, T-NAL interface information, which may also be referred to as T-NAL information, according to an embodiment of the present disclosure will be described. A packet includes T-NAL information in the form of a label so that a lower-layer network entity may determine the loss level, the delay level, or the priority level of a media data packet or resource reservation information about the media data packet from the T-NAL information. Meanwhile, a T-NAL information format of the present embodiment may be used compatibly with other existing protocol standards, for example, an IP header protocol, a Transmission Control Protocol (TCP) and a User Datagram Protocol (UDP) header protocol, and a Real-time Transport Protocol (RTP) header protocol. A call setup process is used between a transmitting network and a receiving network to provide a media service using T-NAL information. That is, T-NAL information represents what label values mean, as agreed among the entities during the call setup process.

According to the present disclosure, a per-class QoS format is defined to be different than a per-stream QoS format for T-NAL information. In the case of per-class QoS control, there is no need for reserving resources between a transmitter and a receiver to provide a service. Thus importance information or priority information about packets of a stream are included in the form of labels. For example, a single video stream is divided into an I frame stream, a B frame stream, and a P frame stream, and label values are determined for distinguishing them. A video stream may be higher than an audio stream in terms of importance. As described later, with reference to FIG. 4, a label value may be inserted into a Type Of Service (TOS) field of an IP version 4 (IPv4) header or a Traffic Class (TC) field of an IPv6 header. For example, if label values are represented in 2 bits, packet importance levels are defined as 11, 10, 01 and 00 sequentially in this order. That is, the label values 11, 10, 01, and 00 may be inserted respectively for an audio packet, a base-layer video packet, an enhancement 1-layer video packet, and an enhancement 2-layer video packet. In SVC, images may be categorized into a base layer image, an enhancement 1 layer image, and an enhancement 2 layer image.

In the case of per-flow QoS control, resources are reserved per stream, and thus, label information is included for each flow. For instance, if 300-kilobits per second (kbps) resources are reserved for a flow with a label value set to 1, a packet generated from the transmitter includes a label value set to 1. Upon detection of the label value in the packet, the network entity transmits the flow in the 300-kbps resources corresponding to the label value 1. However, current available resources should be considered in this case. Meanwhile, resources may be reserved per session. To support label switching during call setup between a transmitting network and a receiving network, label information may be configured for each stream or session for which resources have been reserved.

Resource reservation and label value setting may be preliminarily agreed upon during the call setup between the transmitter and the receiver. When the network entity supports Multi-Protocol Label Switching (MPLS), a label format of the present disclosure may be configured so as to be compatible with a label format supported by the MPLS. If the receiver may distinguish a label of the present invention from an MPLS label, then an existing SVC NAL header may not be transmitted. In addition, information kept unchanged during one session, from among the content of an existing RTP header and UDP header, may be included in a label. Label switching is a technique of routing an Layer 3 (L3) packet at Layer 2 (L2), in which, instead of an IP address, a label is added to a data packet and fast switching is enabled based on the label.

A method for transmitting T-NAL information will be described below.

Figure 4:
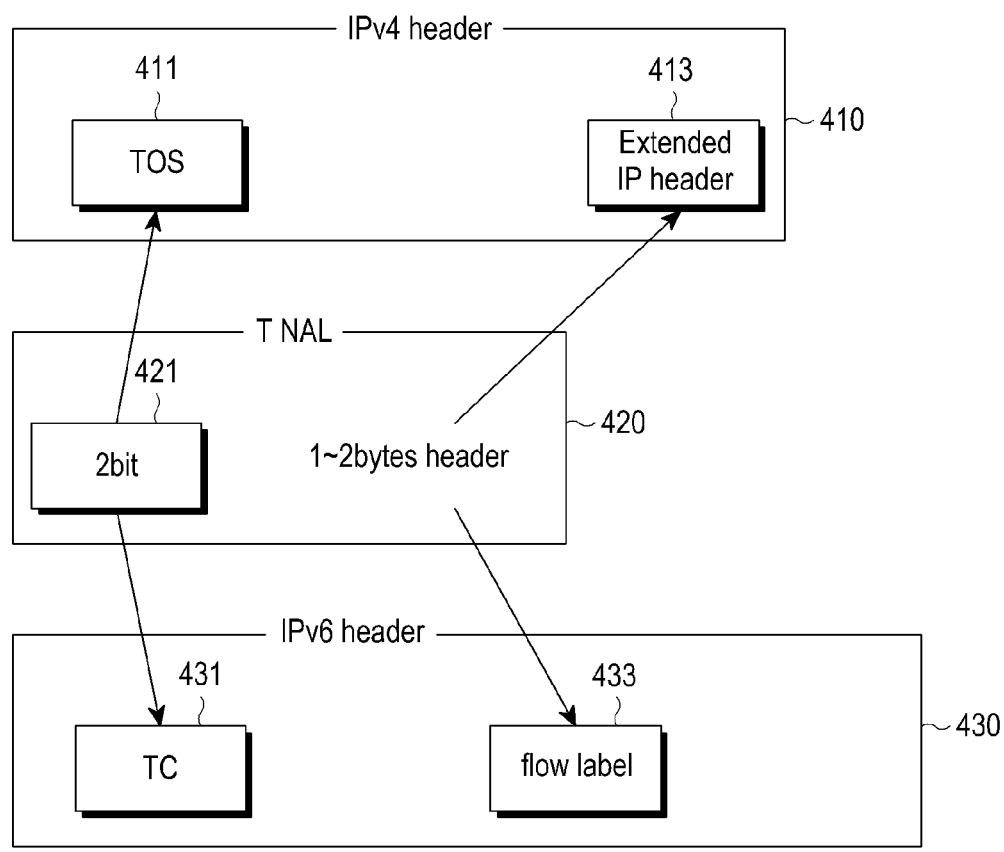
FIG. 4 illustrates a method for including Top-down-NAL (T-NAL) information in an Internet Protocol (IP) packet according to an embodiment of the present disclosure.

FIG. 4 illustrates a method for including T-NAL information in an IP packet according to an embodiment of the present disclosure.

Referring to FIG. 4, a virtual header for a NAL packet may be defined in a T-NAL information format. Information included in the virtual header is used for inclusion in a lower-layer packet header, such as an IP packet header. There are two types of virtual headers, a short (ST) NAL header 421 and a long (LT) NAL header 420.

The ST NAL header 421 is applicable in the case of per-class QoS control at a lower layer and its length is preferably about 2 bits, although it may vary depending on system settings. The ST NAL header 421 may be inserted in a TOS field 411 of an IPv4 header 410 or a TC field 404 of an IPv6 header 430. In contrast, the LT NAL header 420 is applicable in the case of per-flow QoS control at the lower layer and its length is appropriately 1 to 2 bytes, although it may vary depending on system settings. The long NAL header 420 may be inserted into an extended header 413 of the IPv4 header 410 or into a flow label field 433 of the IPv6 header 430.

Figure 5:
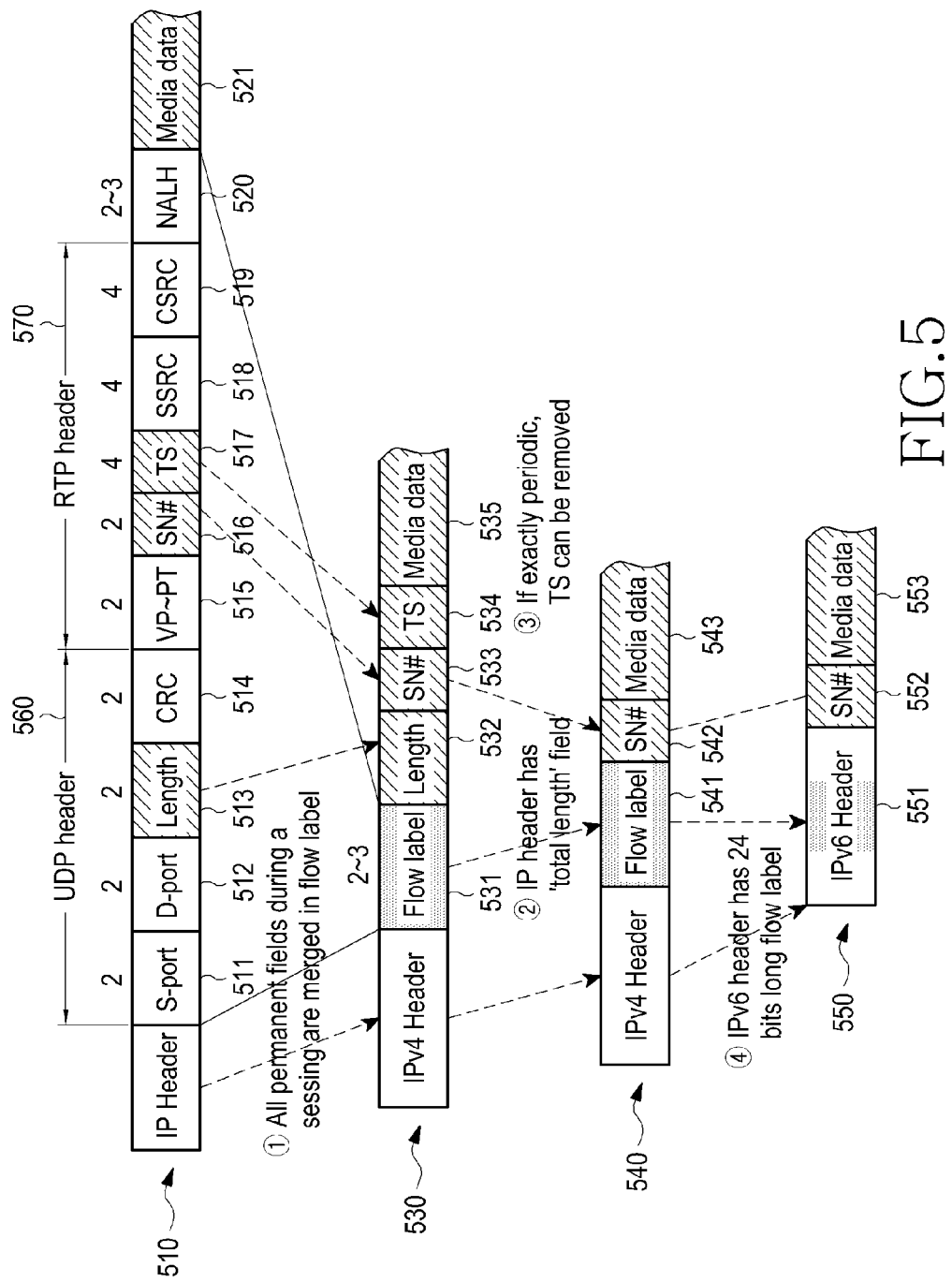
FIG. 5 illustrates an example of generating an optimum IP packet header by including T-NAL information in an IP packet according to an embodiment of the present disclosure.

FIG. 5 illustrates an example of generating an optimum IP packet header by including T-NAL information in an IP packet according to an embodiment of the present disclosure.

Referring to FIG. 5, a header is simplified by removing the same part from UDP and RTP headers in a plurality of packets, for applications corresponding to a real-time media stream, and FIG. 5 illustrates IPv4 packets 510, 530 and 540 and an IPv6 packet 550. For each packet, label information is generated by simplifying the UDP and RTP headers. The IPv4 packet 510 is a media packet carrying real-time media data in a service, such as a Video on Demand (VoD) service and a UDP header 560 and a RTP header 570 are included in the IPv4 packet 510.

In the real-time media service, tens or hundreds of packets per second are usually transmitted in each session. In view of the nature of real-time media streams, media packets include the same fields in their headers during one session. Fields 511, 512, 514, 515, 518, 519 and 520 denote the same repeated fields, wherein field 520 may be referred to as a NAL Header (NALH) field 520 representing a NAL header. As described before with reference to FIG. 2, the NAL header includes information indicating the importance or priority level of a packet. Reference numerals 513, 516 and 517 denote fields that are different in every packet. However, these fields may be redundantly repeated or identical to other fields. A detailed description of the functions of the fields is not provided herein.

The IPv4 packet 530 is configured by collecting the same fields in the UDP header 560 and the RTP header 570 of the IPv4 packet 520 into a single flow label field 531, which includes label information, and arranging fields changing in every packet after the flow label field 531.

Meanwhile, a Length field 532 is identical to a Length field (not shown) of an IP header in the packet 530. Accordingly, the Length field 532 may be omitted. In addition, if media data is generated periodically, the receiver may calculate information set in a TS field 534 representing a time stamp and thus the TS field 534 may be omitted. The IPv4 packet 540 is configured by removing the Length field 532 and the TS field 534 from the packet 530. The IPv6 packet 550 includes a 24-bit flow label field 551 in an IPv6 header. Label information of the present disclosure may be included in the flow label field 551 of the IPv6 header. Compared to a related-art header needing parsing of every field at a receiver, the simplified headers illustrated in FIG. 5 obviate the need for parsing fields corresponding to a flow label all the time.

Now, a description will be given below of bottom-up interface information, B-NAL information, according to the present disclosure. B-NAL information is typically network state information generated from a lower-layer network entity in the present disclosure. However, the B-NAL information may be requested according to QoS quality information generated from a user terminal under circumstances, as stated before. The following description will be given according to the assumption that B-NAL information is network state information.

The network state information may specify an available bitrate, a packet loss ratio, a delay, or a jitter. The network state information may further specify a router buffer status or a reception buffer status. For example, the network information may include a delay measurement and a packet loss ratio measurement resulting from the Real-Time Control Packet (RTCP) transmission protocol, or results measured by a Wireless Local Area Network (WLAN) Medium Access Control (MAC) layer or 3rd Generation Partnership Project (3GPP) Radio Access Network (RAN). Herein, a B-NAL register is updated using the most accurate status information.

The B-NAL information may be generated per stream or per service basis, wherein the per service basis may also be referred to as a per session basis. If the B-NAL information is generated on a per service or per session basis, then an entity may be provided with a B-NAL register for each session. If the B-NAL information is configured on a per stream basis, a B-NAL register may exist for each stream. When a B-NAL packet is transmitted instead of using a B-NAL register, B-NAL packet transmission may be performed on a per session or per stream basis.

The network state information may be represented largely in three methods. One method is to use absolute values. For example, an available bitrate is represented in Megabits per second (Mbps). Another method is to represent information as a relative value with respect to a reference value. For instance, if 1-Mbps resources are reserved during call setup and a current available bitrate is 800 kbps, the available bitrate is represented as "80%". The other method is to use a change rate of information, which is, how much information has been changed from a previous time point is represented.

The B-NAL information may be stored in a B-NAL register of an application system in a higher-layer entity, and the B-NAL register may be configured per service or per stream in a service. In the case where a B-NAL packet is transmitted instead of using a B-NAL register, the B-NAL packet transmission may be performed per session or per stream.

The B-NAL information may be generated periodically or a periodically. If the B-NAL information is generated periodically at the lower layer, then the higher layer may also detect the B-NAL information periodically. If the B-NAL information is generated a periodically, then the higher layer may also detect the B-NAL information a periodically. In this case, when the higher layer generates an interrupt indicating that new information is stored in a B-NAL register, it may detect the B-NAL information stored in the B-NAL register.

A method for updating B-NAL information and returning and retrieving the B-NAL information, so as to use it, will be described below. A B-NAL field provides an Application Programming Interface (API) that updates or returns a state. This operates for the afore-described QoS information or parameters suitable for media control. Each parameter has the API and allows for individual updating or returning. Each parameter takes a form suitable for its characteristics. For instance, a bitrate is stored in the form of an unsigned integer, and a parameter needing a floating point is also stored in a suitable form. An Identification (ID) field is used to identify a register according to a media session or stream. In addition, an updated period field is used to provide updated period information. This field may be set according to a data correction period of the media data provider and the network updates the registers according to the value of this field. If this field is not set, then the network updates a B-NAL register once during establishing an initial session, without re-updates. Herein, the CLO unit 302 (see FIG. 3) operates in a Best Effort (BE) manner without QoS control. In the above aperiodic operation, the period field is filled with all 1s. In this scheme, an interrupt is generated when B-NAL information parameters are updated.

Figure 6:
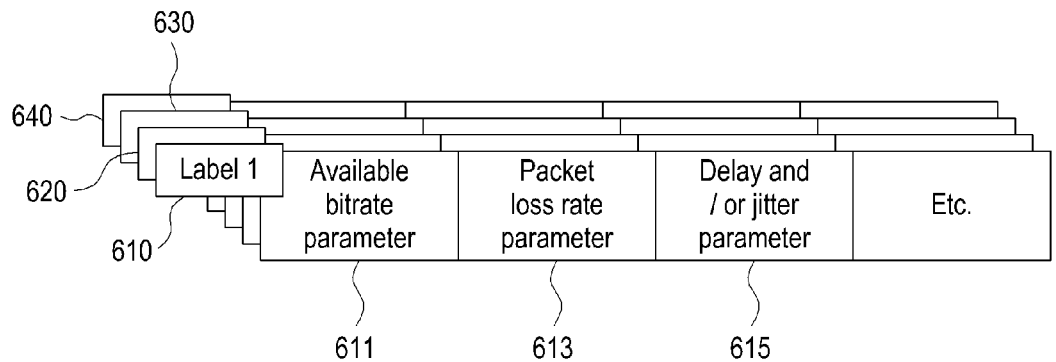
FIG. 6 illustrates a format of per-steam Bottom-up-NAL (B-NAL) information according to an embodiment of the present disclosure.

FIG. 6 illustrates a format of per-steam B-NAL information according to an embodiment of the present disclosure.

Referring to FIG. 6, as indicated by label 610, 620, 630 and 640, B-NAL information is generated per stream and added with label information corresponding to each stream. The B-NAL information of a stream with a label includes an available bitrate parameter 611, a packet loss rate parameter 613, a delay and/or jitter parameter 615, and other similar and or suitable parameters. The label information includes an update period and a session or flow ID.

The T-NAL information and B-NAL information of the present disclosure have been described so far. CLO is possible using the T-NAL information and the B-NAL information. CLO may refer to providing a media data service through network-aware video coding and operations based on awareness of information about media streams, that is, the importance or priority levels of the media streams by a media network entity. An entity that provides services based on information about media streams is called a Media Aware Network Element (MANE). The following description will be given using the term "MANE".

Now, a description will be given of an operation of a network entity of the present disclosure, that network entity being a MANE.

A network entity, such as a router, a MAC layer of Institute for Electrical and Electronics Engineers (IEEE) 802 series, and a 3GPP Broadcast/Multicast Service Center (BMSC), that forwards a received media packet, may operate as a MANE that adaptively forwards a packet according to the importance of the packet determined from label information of T-NAL information. For instance, if the amount of data exceeds a buffer capacity, a router using a diffServ routing scheme discards packets, starting from the lowest priority level. For this purpose, the router checks the label value of a T-NAL.

In the case of per-class QoS control, a received packet is adaptively processed according to importance information, i.e. a label value, included in the IP header of the packet, irrespective of a service to which the packet belongs to. For example, when an audio packet with a label value 11, a base layer video packet with a label value 10, an enhancement 1 layer video packet with a label value 01, and an enhancement 2 layer video packet with a label value 00, are received and one of the packets should be discarded due to a network state or due to a data amount exceeding the capacity of a router buffer, then a packet is discarded according to the label values. That is, the enhancement 2 layer video packet, the enhancement 1 layer video packet, the base layer video packet, and the audio packet are discarded in this order. In the IEEE 802.11e standard, packets are queued in queues that are predetermined according to importance information included in the IP headers of the packets. In general, the packets are prioritized in four steps and each queue may be different in terms of the speed of a packet that goes out from the queue and a packet loss processing method.

In the case of per-flow QoS control, a label value is checked and QoS, such as a bitrate, a loss ratio, a delay, and other similar parameters, is supported using predetermined resources corresponding to the label value. Resources corresponding to the label may be determined by referring to a resource reservation table per stream, the resource reservation table being pre-stored in the network entity. For example, if the QoS class of an audio stream is Unsolicited Guaranteed Service (USG) in IEEE802.16, QoS requirements preset for the QoS class are guaranteed. Accordingly, the resource reservation table is preserved in the network entity until the service ends. That is, upon receipt of a packet from a transmitter, the label of the packet is checked and QoS requirements for a stream corresponding to the label are detected from the resource reservation table. Then the service is provided using resources according to the QoS requirements.

Figure 7:
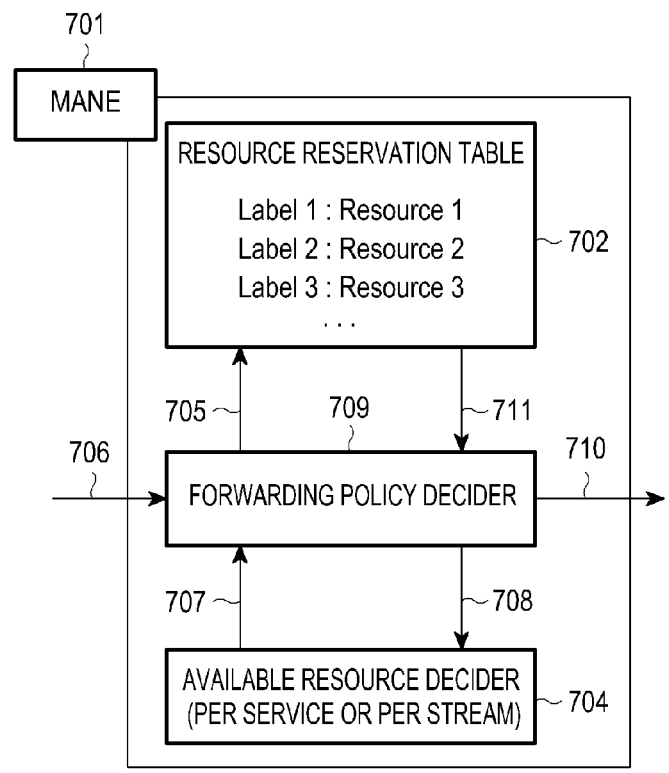
FIG. 7 illustrates an operation of a Media Aware Network Element (MANE) according to an embodiment of the present disclosure.

FIG. 7 illustrates an operation in a MANE according to an embodiment of the present disclosure.

Referring to FIG. 7, a MANE 701 includes a resource reservation table 702, a forwarding policy decider 709, and an available resource decider 704.

Upon receipt of a packet from a transmitter (not shown) in operation 706, the forwarding policy decider 709 adaptively forwards the packet according to a forwarding policy. The forwarding policy varies depending on a label value included in T-NAL information of the received packet.

If the MANE 701 supports per-class QoS, then the forwarding policy decider 709 determines the class of the packet and then determines whether to forward the packet according to the class of the packet. On the other hand, if the MANE 701 supports per-stream QoS, the forwarding policy decider 709 determines the label value of the packet in operation 705, detects resources allocated to the label in a resource reservation table 702 in operation 711, receives available resource information from the available resource decider 704 in operation 707, determines a forwarding policy for the packet within the available resources, and then forwards the packet according to the forwarding policy in operation 710.

Now, a brief description will be given of an operation of a receiver according to an embodiment of the present disclosure. The receiver includes a decoder for each stream and secures as much a buffer capacity as needed in a specific decoder. If a received packet includes a label, the receiver determines the label and determines a decoder corresponding to the packet. In the absence of a label in the packet, the receiver reads an RTP header and determines a decoder for decoding the media packet according to the RTP header.

An entity having a B-NAL register that receives and stores B-NAL information will be described below. In the case of a unicast media service, such as a 1:1 video call or VoD service, a transmitter may have a B-NAL register. B-NAL information in the B-NAL register at the application layer of the transmitter is updated with a B-NAL packet received from a MANE or a receiver. In this case, the transmitter adaptively transmits media data by reading the B-NAL register periodically or a periodically. For example, given an available bitrate of 54 Mbps, if a user enters a shadowing area, the available bitrate drops to 2 Mbps and a packet loss ratio is increased, this network state information may be transferred to and stored in the B-NAL register. Then the transmitter transmits an image of an SVC lowest layer and transmits as many FEC packets as needed to overcome the packet loss. If the receiver requests a media quality, a B-NAL register is configured in the receiver. The receiver receives B-NAL information from a network and requests an appropriate QoS level for a next transmission packet according to the B-NAL information.

Meanwhile, in the case of a multicast/broadcast packet, as in a multi-point video call such as a video conference, the transmitter transmits the packet with a maximum QoS set in it. The packet is transferred according to a needed QoS level at a branch of the packet path. Alternatively, the receiver determines its reception capability based on its B-NAL information and selectively receives a distributed service of a branch. For example, if a 10-Mbps SVC HDTV service is provided simultaneously to an HDTV connected to a VDSL and a portable phone connected to High-Speed Downlink Packet Access (HSDPA) and there exists a MANE at the point where two paths are separated, a MANE, such as a 3GPP BMSC, may have a B-NAL register. In this example, given an available bitrate of 5 Mbps, if the available bitrate is dropped to 2 Mbps and the packet loss ratio is increased due to the existence of a user in a shadowing area, this network information is recorded in the B-NAL register of the MANE. In this case, the MANE forwards only a lower-layer SVC image and transmits as many FEC packets as needed to overcome the loss ratio. The data amount of transmitted media data and FEC packets should be within 2 Mbps.

If a new broadcast or multicast service is connected, data needed for initial call setup may be requested and received from a server through one-to-one communication by random access. Or the server may transmit information needed for random access periodically. If the service lasts 24 hours, a specific default T-NAL should be defined.

Meanwhile, if a user requests a QoS guarantee for a packet, a user-requested QoS is recognized through a User Interface (UI) provided by a user application layer. In the case of a unicast service, the requested QoS is signaled to and recorded in a B-NAL register of a transmitter. In the case of a multicast service, the requested QoS is recorded in a B-NAL register of a MANE that manages traffic input to a user terminal. If the requested QoS exceeds a QoS range supported by the network, then the service is limited to the supported QoS range. On the other hand, if the requested QoS falls within the QoS range supported by the network, then the service is provided with the requested QoS to the user.

While the present disclosure has been particularly shown and described with reference to embodiments thereof, it will be understood by those of ordinary skill in the art that various changes in form and details may be made therein without departing from the spirit and scope of the present disclosure as defined by the following claims.

The invention claimed is:

1. A method for transmitting multimedia data by an entity, the method comprising:
   receiving bottom-up network abstraction layer (B-NAL) information from an underlying layer to an application layer;
   determining a multimedia data quality to optimize a delivery of the multimedia data based on the received B-NAL information;
   generating a packet including the multimedia data based on the determined media data quality; and
   transmitting the generated multimedia data,
   wherein the B-NAL information comprises network channel condition information.

2. The method of claim 1, wherein the B-NAL information further comprises at least one of service quality information and control information requested by a terminal.

* * * * *